United States Patent
Hui et al.

[11] Patent Number: 5,673,595
[45] Date of Patent: Oct. 7, 1997

[54] FOUR DEGREE-OF-FREEDOM MANIPULATOR

[75] Inventors: Raymond Chung-Ying Hui, Montreal; Alain Gerard Ouellet, Moncton; Andrew Wang, Markham; George Vukovich, St-Bruno, all of Canada

[73] Assignee: Canadian Space Agency, Saint-Hubert, Canada

[21] Appl. No.: 446,069

[22] Filed: May 19, 1995

[51] Int. Cl.[6] .................................................. G05G 11/00
[52] U.S. Cl. ...................... 74/490.05; 901/15; 414/729; 414/680
[58] Field of Search ........................... 74/490.05, 490.01, 74/490.03; 901/8, 15, 23; 414/680, 729

[56] References Cited

U.S. PATENT DOCUMENTS

| | | | |
|---|---|---|---|
| 4,976,582 | 12/1990 | Clavel | 414/729 |
| 5,040,626 | 8/1991 | Paynter | 901/15 |
| 5,107,719 | 4/1992 | Kota | 901/15 |
| 5,130,632 | 7/1992 | Ezawa | 901/15 |
| 5,279,176 | 1/1994 | Tahmasebi et al. | 74/479 B |
| 5,301,566 | 4/1994 | Tahmasebi et al. | 74/479 B |
| 5,333,514 | 8/1994 | Toyama | 74/490.03 |
| 5,447,409 | 9/1995 | Grunes | 74/490.03 |
| 5,522,275 | 6/1996 | Mauletti | 901/15 |

FOREIGN PATENT DOCUMENTS

| | | |
|---|---|---|
| 295118 | 10/1991 | Germany. |
| 528194 | 10/1976 | U.S.S.R. . |
| 1505755 | 9/1989 | U.S.S.R. . |
| 1733774 | 5/1992 | U.S.S.R. . |

*Primary Examiner*—Charles A. Marmor
*Assistant Examiner*—David M. Fenstermacher
*Attorney, Agent, or Firm*—Dowell & Dowell

[57] ABSTRACT

A four degree of freedom manipulator which comprises a pair of elongate rigid legs connected by a joint. The joint acts as an end-effector or an end-effector is attached thereto. The legs effectively intersect at a point in the joint. The positioning end of each leg is attached to a two degree of freedom positioning mechanism that can position it in a two dimensional plane. The connection between the leg and the positioning mechanism has two passive rotational degrees of freedom. Preferably five bar mechanisms are used as the positioning mechanisms. The manipulator can control the position and orientation of an end-effector.

14 Claims, 4 Drawing Sheets

FOUR DEGREE-OF-FREEDOM MANIPULATOR

FIELD OF THE INVENTION

This invention relates to manipulators in general and in particular to manipulators having four degrees-of-freedom in which the position and orientation of the end-piece are controlled.

BACKGROUND OF THE INVENTION

There are many applications for manipulators in which control of the position and orientation of an end-piece is practical and necessary. For example manipulators may be used as hand controllers, manipulanda, haptic devices and force-reflecting mechanisms. These devices are used in robotic applications and automated industrial applications, as well as in virtual reality applications.

Traditionally, there are two design approaches for providing position and orientation manipulators namely serial and parallel mechanisms. Serial mechanisms consist of a plurality of mechanical links connected in series by revolute or prismatic joints, resulting in a mechanism or arm that is a simple chain with no loops. At the distal end thereof there is an end-piece or end-effector. The main advantages of this design approach is the large range of motion for the end-piece and the relative simplicity of the forward kinematic model. Disadvantages of serial mechanisms include low output force/mass and stiffness/mass ratios due to the need to provide power directly to each joint by either mounting actuators directly thereon or by transmitting the power to each joint from base-mounted actuators. Where actuators are mounted directly on each joint, each joint must be able to support the mass of all the actuators in addition to the links that are between that joint and the end-piece. The inertia of an actuator includes the inertia of the end-piece (load) and those links and actuators that it supports. Therefore, depending on the task being performed and the weight requirements of the links and actuators, serial configurations are not always practicable.

Parallel mechanisms, on the other hand, comprise two or more branches of linkages connected in parallel to an end-piece or end-effector so that one or more closed loop is formed. Parallel or closed loop mechanisms are advantageous because they provide high output force/mass and stiffness/mass ratios and are capable of higher speed and positioning accuracy of the end-piece over serial mechanisms. Disadvantages of parallel mechanisms include limited range of motion; interference of the component links; design complexity due to high number of joints, particularly passive ones; and complexity of the kinematic model. With regard to the last disadvantage, closed loop forward kinematic models, which compute the position and orientation of the end-piece given the position of the controlled or measured joints, exist only for special parallel mechanisms and nevertheless are more complex than those of serial mechanisms.

Hand-held input devices or manipulators are routinely used, for example, for control of aircraft robotic manipulators and remote control of mechanical systems in general. In certain applications the input device may be a passive device, that is the input position is measured and there is no force reflection. In other applications such as virtual reality applications force reflection, that is the ability of the mechanism to resist the operator's motion, is desirable or required. In both passive and force-reflecting hand input devices the aforementioned advantages of parallel control mechanisms are desirable.

U.S. Pat. No. 5,279,176 issued to Tahmasebi et al. on Jan. 18, 1994 shows a six degree-of-freedom (DOF) mechanism which provides control of position and orientation of a platform by controlling the positions of the ends of three rigid legs supporting the platform. The other end of each leg is attached to a two DOF driver, such as a five-bar linkage, by a universal joint. The drivers move the legs parallel to a base to adjust the position of the platform. The device is designed to provide only small platform displacements with high resolution and stiffness which is achieved in part with the rigid legs. However, many applications do not require six DOF and thus this mechanism is much more complex than required for those applications. For example the positioning of parts on a conveyor belt or elsewhere in an assembly operation would not require six DOF.

There have been various mechanisms proposed for applications where three or four DOF devices are used. Such an example is shown in U.S. Pat. No. 4,976,582, issued to Clavel on Dec. 11, 1990 which provides position control of an end-piece while its orientation remains fixed. Three control arms are connected to actuators mounted on a base and are constrained to rotate about an axis perpendicular to the longitudinal axis of the arm. The other end of the control arms are each connected to a pair of spaced, parallel linking bars via carbon type articulations or ball and socket joints. The platform is constrained to move in a fixed orientation so that it remains parallel to itself as it moves in three dimensions. An end-piece or end-effector is mounted on the movable platform. It is possible to control the roll rotation (about an axis perpendicular to the plane of the end-piece) of the end-piece by virtue of an additional motor driving the end-piece via an universal joint and a telescopic link. While this device does provide for three DOF the forward kinematic model would be relatively complex.

Accordingly, it would be advantageous to provide a manipulator with four DOF and a relatively simple closed-form forward kinematic model and relatively few parts.

SUMMARY OF THE INVENTION

The present invention discloses a four degree-of-freedom manipulator. The manipulator comprises a first elongated rigid leg having a joint end, a positioning end and a longitudinal axis and a second elongated rigid leg having a joint end, a positioning end and a longitudinal axis. A first joint rotationally connects the joint end of the first elongated rigid leg to a rigid shaft. The first joint has an axis of rotation. A second joint rotationally connects the joint end of the second elongated rigid leg to the rigid shaft. The second joint has an axis of rotation. The axis of rotation of the first joint and the axis of rotation of the second joint have a fixed angle and displacement therebetween. The manipulator comprises a first positioning means which is connected to the positioning end of the first elongated rigid leg and is adapted to position the positioning end of the first elongated rigid leg in a predetermined first plane and the connection has two passive degrees of rotational freedom. A second positioning means is attached to the positioning end of the second elongated rigid leg and is adapted to position the positioning end of the second elongated rigid leg in a predetermined second plane and the connection has two passive degrees of rotational freedom. Preferably the fixed angle between the first and second planes is 180°; the first and second positioning means are five-bar mechanisms; and the first and second elongated rigid legs are the same length.

Further features of the invention will be described or will become apparent in the course of the following detailed description,

BRIEF DESCRIPTION OF THE DRAWINGS

The following is a description, by way of example only, of different embodiments of the four degree-of-freedom manipulator forming the present invention and will now be described with reference to the accompanying drawings, in which.

DETAILED DESCRIPTION OF THE INVENTION

Figure 1:
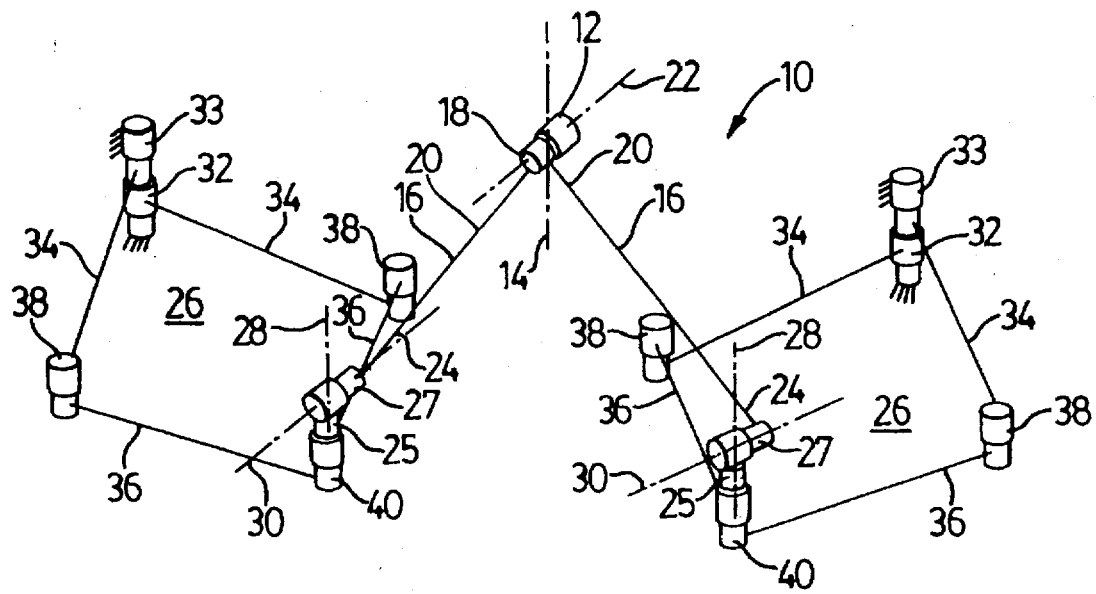
FIG. 1 is a perspective diagrammatic representation of a manipulator of the present invention.

Referring to FIG. 1, a manipulator having four degrees-of-freedom (DOF) constructed in accordance with the present invention is shown generally at 10. An end-piece or end-effector 12 can be positioned in three dimensional space and has one axis of rotation (shown in phantom at 14).

Manipulator 10 includes a pair of elongated rigid legs 16 connected by a revolute joint 18 which acts as the end-effector 12. It will be appreciated by those skilled in the art that joint 18 may act as the end-effector 12, as shown here, or a separate end-effector may be attached thereto.

Revolute joint 18 connects the joint ends 20 of the elongated rigid legs 16. Joint 18 defines a plane of motion for each elongated rigid leg 16. Joint 18 defines a fixed angle between the planes of motion. Preferably the planes of motion are the same plane and the fixed angle is 180°, as shown in FIG. 1. Effectively, the ends of elongated rigid legs 16 meet at a point and this point is at a defined point along the axis of rotation 22 of revolute joint 18. Revolute joint 18 has a rigid shaft which fixes the angle between the planes of motion.

Positioning ends 24 of legs 16 are each attached to a two DOF positioning mechanisms 26. Positioning mechanisms 26 are connected to positioning ends 24 by way of two interconnected perpendicular revolute joints 25 and 27 and thus provide two passive rotational degrees of freedom shown here as having vertical and horizontal axes 28 and 30 respectively. Positioning mechanisms 26 move positioning ends 24 in their respective workplanes.

Positioning mechanisms 26 are co-axial five-bar mechanisms. Each positioning mechanism 26 is driven by two actuators 32 and 33 shown in FIG. 1 mounted on top of each other. That is actuators 32 and 33 are co-linear. Each actuator 32, 33 controls the movement of a primary link 34 which is connected in series to a secondary link 36 by a revolute joint 38 having an axis of rotation perpendicular to the workplane. The secondary links 36 are connected together by a revolute joint 40. By controlling or determining the position of primary links 34 the position of joint 40 is determinable. Revolute joint 25 is an extension of revolute joint 40 and is configured such that positioning end 24 of legs 16 are passively rotatable around the axis of joint 40 shown in FIG. 1 as 28.

Actuators 32, 33 may be simple rotary motors, or motors in combination with a transmission. Preferably actuators 32, 33 rest in the workplanes of the respective positioning mechanisms 26 and are fixed thereto as shown in FIG. 1. The actuators which typically constitute the greatest mass component of positioning mechanism 26 will not exert a static load and, since the actuator is fixed, the inertial load will also be decreased over prior art mechanisms. Positioning mechanisms 26 shown in FIG. 1 have a common workplane. Preferably both positioning mechanisms 26 have identical or comparable power characteristics.

Manipulator 10 includes eleven passive revolute joints which is a relatively low number of joints for a parallel control mechanism and thus it is characterized by relatively low friction and backlash as compared to prior art mechanisms.

The forward kinematic model its relatively straightforward. The vertical position of end-effector 12 (as shown in FIG. 1) is a simple function of the distance between joints 27 attached to positioning ends 24 of legs 16. In the case where legs 16 are equal in length the vertical position of end-effector 12 is determined using a simple formula for the height of an equilateral triangle. The end-effector 12 is raised by moving joints 27 closer together or lowered by moving them further apart. The horizontal positioning of end-effector 12 is controlled by positioning joints 27 and where legs 16 are equal in length it is the midpoint between joints 27. The horizontal position of end-effector 12 is controlled by moving joints 27 concurrently in the desired direction. Similarly, the orientation of end-effector 12 is controlled by positioning joints 27. To rotate end-effector 12 about rotational axis 14 (shown in FIG. 1) without altering its horizontal or vertical position, joints 27 trace equal arcs of a circle with a fixed radius and a fixed center which at any given point is the projection of end-effector 12 onto the workplane.

The four degree of freedom manipulator of the present invention has a number of advantages over the prior art parallel manipulators. The number of parts including joints is relatively low as compared to prior art parallel mechanisms thus making the forward and inverse kinematic models more straightforward. The two legs 16 of the manipulator 10 supporting the end-effector 12 effectively meet at a point which helps make the forward and inverse kinematic model more straightforward. Because of the low number of parts and the arrangement of the positioning mechanisms, the chance of mechanical interference is reduced. Since the actuators 32, 33 are located at the base and are stationary, the mass and inertia of the system are reduced and therefore the payload capacity and potential speed is increased which is an advantage over prior art serial mechanisms. Further, the manipulator of the present invention has high rigidity and therefore higher bandwidth and greater positioning repeatability than prior art serial mechanisms.

Figure 2:
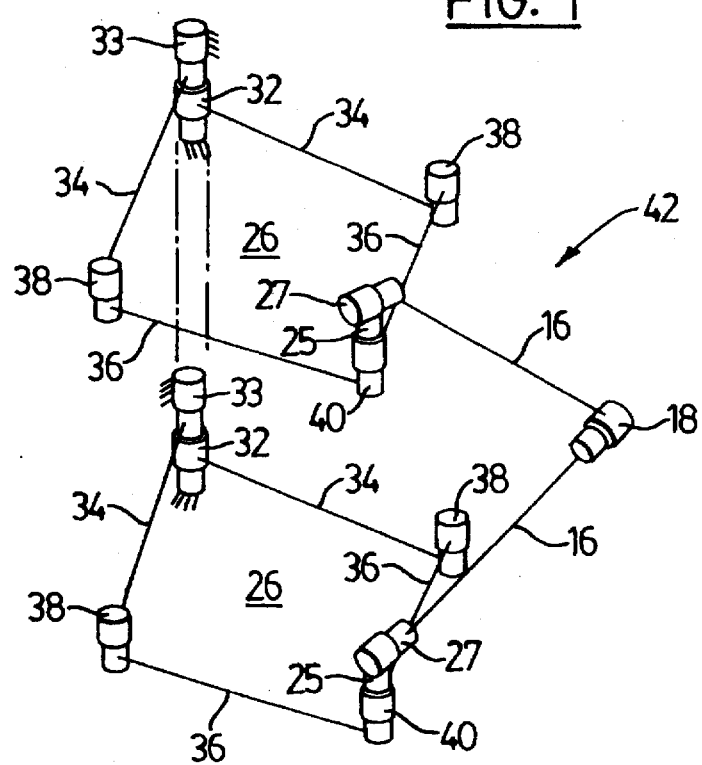
FIG. 2 is a perspective diagrammatic representation of an alternate embodiment of a manipulator of the present invention showing the first and second positioning mechanisms in a vertical spaced relationship.

There are a number of variations that may be made while staying within the scope of the present invention. For example, referring to FIG. 2, a manipulator 42 includes two positioning mechanisms 26 in different spaced apart planes. Positioning mechanisms 26 may be fixed in any plane convenient to the user and they are shown here fixed in two spaced apart horizontal planes with pairs of actuators 32, 33 in vertical alignment. The remainder of manipulator 42 is as described above with regard to manipulator 10 shown in FIG. 1.

Figure 3:
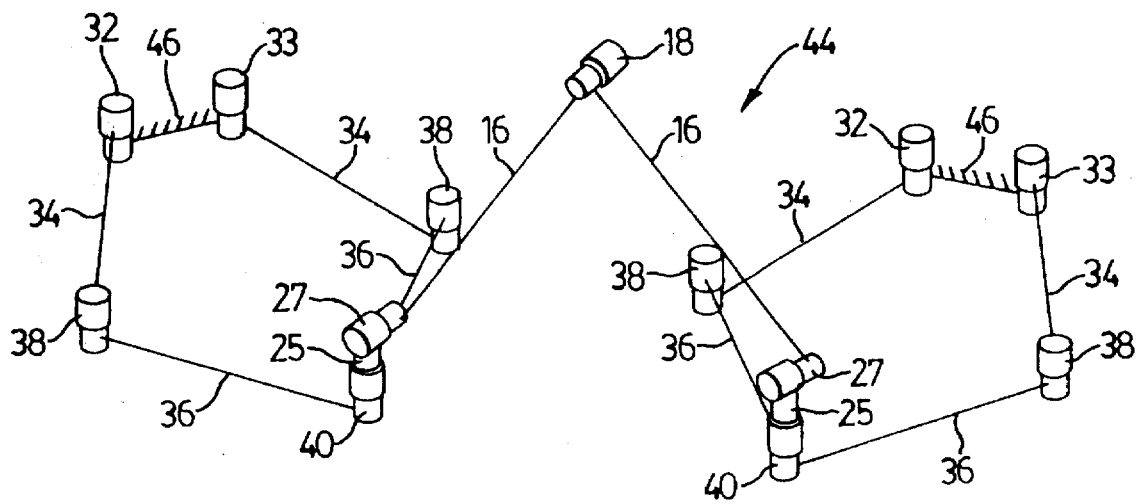
FIG. 3 is a perspective diagrammatic representation of an alternate embodiment of a manipulator of the present invention showing a non-coaxial five-bar positioning mechanisms in horizontal spaced relationship.

FIG. 3 shows a manipulator 44 which includes positioning mechanisms 26. Positioning mechanisms 26 are five bar mechanisms wherein the pair of actuators 32, 33 are co-planar with a link 46 between each pair of actuators 32, 33 rather than co-linearly mounted as shown in FIG. 1. Link 46 may be, but need not be, parallel. The remainder of manipulator 44 is the same as for manipulator 10.

Figure 4:
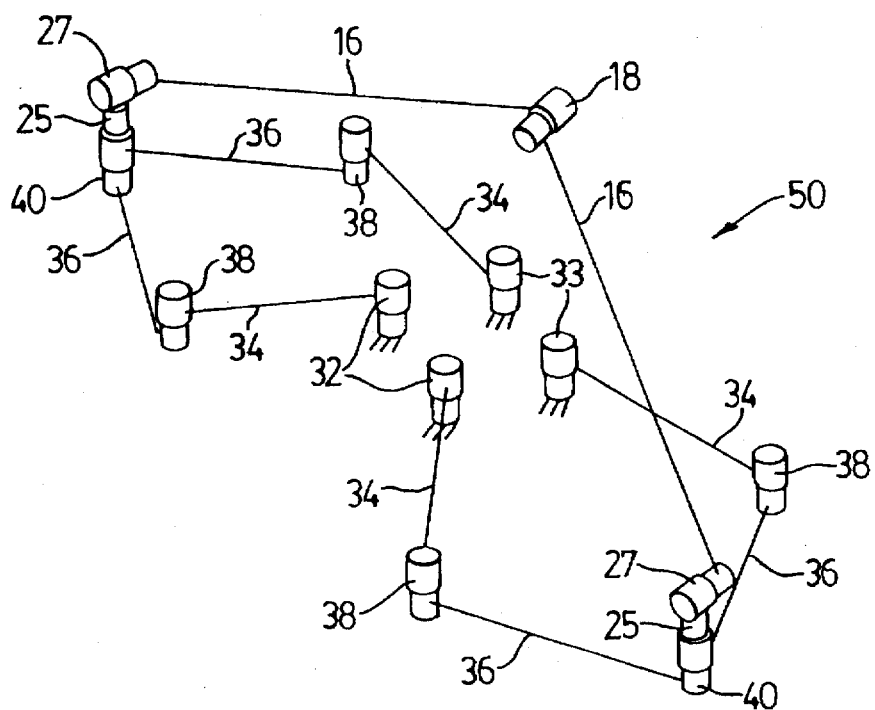
FIG. 4 is a perspective diagrammatic representation of an alternate embodiment of a manipulator of the present invention showing non-coaxial five-bar positioning mechanisms in an alternate horizontal spaced relationship.

FIG. 4 shows a manipulator 50 which is very similar to that shown in FIG. 3 wherein the positioning mechanisms 26 are positioned with pair of actuators 32, 33 being positioned adjacent to each other and link 46 being eliminated.

Figure 5:
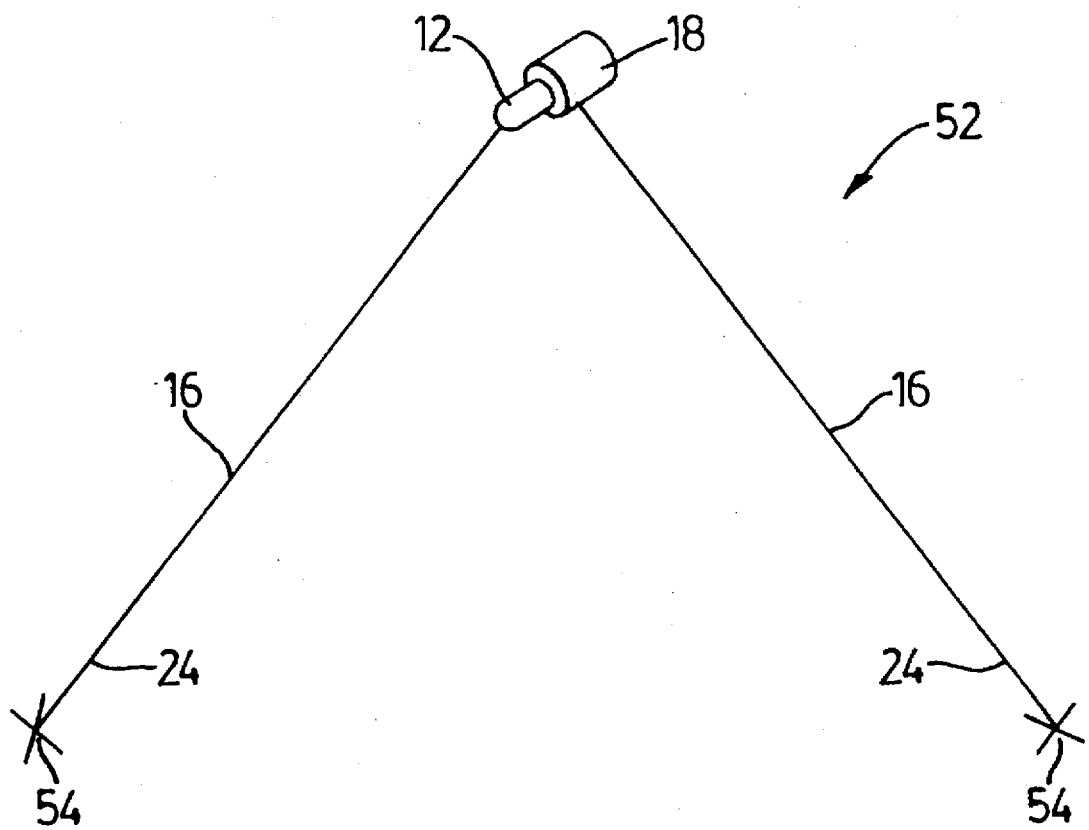
FIG. 5 is a diagrammatic representation of a manipulator of the present invention.

FIG. 5 shows a diagrammatic representation of a manipulator 52. Manipulator 52 includes a pair of legs 16 and a revolute joint 18 which acts as an end-effector 12. The positioning ends 24 of legs 16 are attached to positioning elements 54 which are capable of positioning positioning ends 24 in an effective two dimensional plane. Any two DOF mechanism can be used as positioning element 54, however, preferably it is a five bar mechanism as shown in FIG. 1.

Figure 6:
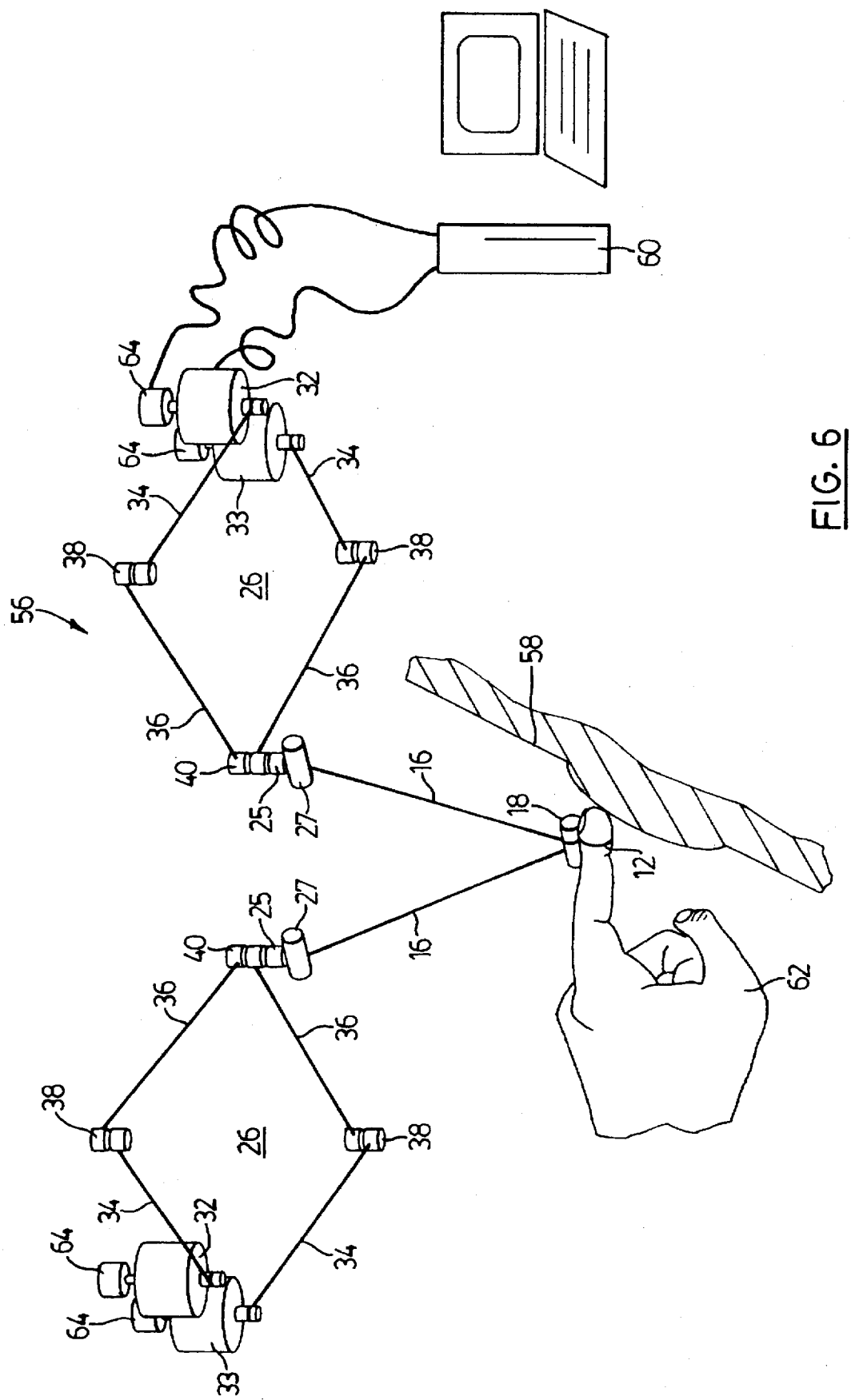
FIG. 6 is a perspective view showing a user employing the manipulator of FIG. 3 to interact with a virtual wall.

The different embodiments shown herein may be used for both passive and force-reflecting manipulators. Passive manipulators are input devices which record the displacement of an end-effector through detecting the displacement of the positioning end of each leg and then determining the position of the end-effector. The displacement of the positioning end of each leg is determined by sensors operably coupled to the joints or actuators. Force-reflecting manipulators can also resist the motion of the end-effector thus such manipulators may be used to prevent the end-effector from moving into a restricted zone due to operational or mechanical constraints. Accordingly the force-reflector mode can be used to detect virtual properties such as a virtual wall. FIG. 6 shows manipulator 56 in use as a force-reflecting manipulator adapted to detect a virtual wall 58.

Manipulator 56 is similar to manipulator 48 shown in FIG. 3 with an end effector 12, a pair of elongated legs 16, a pair of five bar positioning mechanisms 26 and actuators 32, 33. End-effector 12 is attached to revolute joint 18 so that it can be easily manipulated by a user 62. Actuators 32, 33 are operably attached to a computer-based controller 60 which receives information from actuators 32, 33 and computes the position of end-effector 12. Where end-effector 12 is proximate to a virtual wall 56 controller 60 restricts the movement of end effector 12 so that it cannot "pass through" the virtual wall 58.

FIG. 6 depicts a user 62 working with a force-reflecting input device integrated with actuators 32, 33, sensors 64 and a computer-based controller 60. Each actuator 32,33 is coupled to a position sensor 64 which may be an optical encoder of the incremental or absolute variety, a resolver, a potentiometer or any other position sensing device commonly used for robotic applications. Sensors 64 provide feedback of the positions of the actuators 32, 33 to controller 60. Based on this feedback, a computer algorithm based on the method of forward kinematics described above, calculates the position of the end-effector 12 of the input device, or equivalently, the position of the operating finger. The computer controller 60 superimposes the model of the virtual world onto the workspace of the operating finger (algorithmically speaking) and regularly verifies whether the finger is in contact with any of the virtual objects. In case contact is detected, the actuators are commanded to apply a force such that the operating finger experiences the appropriate force arising from its interaction with the virtual object(s).

When a user is interacting with a graphical environment on a computer with the aid of a force-reflecting mechanism, the user is looking mostly at the computer screen and not the mechanism. In order for the user to navigate in the graphical environment using the input device as naturally as possible, the user should feel as little of the structural properties, such as friction, weight, inertia, flexibility and backlash, of the device as possible, and should feel mostly the forces arising from interaction with the virtual world. The invention described herein reduces the structural properties and is thus very suitable for this application.

It will be appreciated that the above description related to embodiments by way of example only. Many other variations on the invention will be obvious to those skilled in the art and such equivalent variations are within the scope of the invention as described herein whether or not expressly described.

What is claimed as the invention is:

1. A four degree-of-freedom manipulator comprising:

a first elongated rigid leg having a joint end, a positioning end and a longitudinal axis;

a second elongate rigid leg having a joint end, a positioning end and a longitudinal axis;

a first joint rotationally connecting the joint end of the first elongate rigid leg to a rigid shaft, said first joint having an axis of rotation, said first joint defining a first plane of motion for the first elongate rigid leg and a second plane of motion for the second elongate rigid leg and the first and second planes of motion are oriented with a fixed angle therebetween;

a first positioning means connected to the positioning end of the first elongate rigid leg adapted to position the positioning end of the first elongate rigid leg in a first workplane;

a first connection connecting the first positioning means to the positioning end of the first elongate rigid leg having two passive degrees of rotational freedom with non-parallel axes of rotation;

a second positioning means connected to the positioning end of the second elongate rigid leg adapted to position the positioning end of the second elongate rigid leg in a second workplane; and a second connection connecting the second positioning means to the positioning end of the second elongate rigid leg having two passive degrees of rotational freedom with non-parallel axes of rotation.

2. A manipulator according to claim 1 wherein the first joint is a revolute joint.

3. A manipulator according to claim 2 wherein the longitudinal axis of the first elongate rigid leg and the longitudinal axis of the second elongate rigid leg intersect along the axis of rotation of the first joint.

4. A manipulator according to claim 3 wherein the length of the first rigid leg equals the length of the second rigid leg.

5. A manipulator according to claim 1 wherein the first positioning means is a first five-bar mechanism and the second positioning means is a second five-bar mechanism.

6. A manipulator according to claim 5 wherein the first five bar mechanism is a co-axial five bar mechanism and the second five bar mechanism is a co-axial five bar mechanism.

7. A manipulator according to claim 5 wherein the first workplane and the second workplane are the same workplane.

8. A manipulator according to claim 5 wherein the first workplane and the second plane are parallel.

9. A manipulator according to claim 5 wherein the first and second five bar mechanisms have a pair of primary links and further comprising a sensing means attached to each of the primary links for sensing the position of the primary links.

10. A manipulator according to claim 5 wherein the first and second five bar mechanisms have a pair of primary links and further comprising a control means attached to each of the primary links for positioning of the primary links.

11. A manipulator according to claim 1 further comprising a control means attached to the first and second positioning means for determining the position of the first joint and exerting force on the first joint so that the joint acts as a force-reflector.

12. A manipulator according to claim 1 further comprising a sensing means attached to the first and second positioning means for sensing the position of the first joint.

13. A manipulator according to claim 1 further comprising a control means attached to the first and second positioning means for determining the position of the first joint.

14. A manipulator according to claim 1 further comprising a control means attached to the first and second positioning means for determining the positioning of the position end of the first and second leg thereby controlling the position and orientation of the first joint.

* * * * *